United States Patent [19]
Khanarian et al.

[11] Patent Number: 6,090,888
[45] Date of Patent: *Jul. 18, 2000

[54] CYCLIC OLEFIN POLYMER BLENDS EXHIBITING IMPROVED IMPACT RESISTANCE AND GOOD TRANSPARENCY

[75] Inventors: Garo Khanarian, Berkeley Heights; Thomas J. Dolce, Stirling, both of N.J.

[73] Assignee: Hoechst Celanese Corporation, Somerville, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/659,610

[22] Filed: Jun. 6, 1996

[51] Int. Cl.7 .............................. C08L 53/02; C08L 45/00
[52] U.S. Cl. .............................................. 525/88; 525/210
[58] Field of Search ....................... 525/210, 88

[56] References Cited

U.S. PATENT DOCUMENTS

| | | | |
|---|---|---|---|
| 4,166,083 | 8/1979 | Ueda et al. | 525/210 |
| 4,258,145 | 3/1981 | Wright | 525/89 |
| 4,310,637 | 1/1982 | Dewitt | 525/210 |
| 4,357,449 | 11/1982 | Yi | 525/211 |
| 4,418,178 | 11/1983 | DeWitt | 525/97 |
| 4,444,951 | 4/1984 | Mendelson | 525/210 |
| 4,977,226 | 12/1990 | Sugawara et al. | 525/98 |

FOREIGN PATENT DOCUMENTS

| | | | |
|---|---|---|---|
| 0 269 948 A2 | 6/1988 | European Pat. Off. | C08G 61/02 |
| 0 335 985 A1 | 10/1989 | European Pat. Off. | C08L 23/08 |
| 661345 | 12/1994 | European Pat. Off. . | |
| 719806 | 7/1996 | European Pat. Off. . | |
| 0 726 291 A1 | 8/1996 | European Pat. Off. | C08L 23/08 |
| 4202108 | 7/1993 | Germany . | |
| 5-287173 | 11/1993 | Japan . | |
| 6-145462 | 5/1994 | Japan . | |
| 7-166009 | 6/1995 | Japan . | |
| 7-258504 | 10/1995 | Japan . | |

OTHER PUBLICATIONS

Patent Abstracts of Japan, vol. 018, No. 462 (C–1243), Aug. 29, 1994 & JP 06 145462 A (Sumitomo Bakelite Co Ltd), May 24, 1994.

Patent Abstracts of Japan, vol. 095, No. 009, Oct. 31, 1995 & JP 07 166009 A (Toppan Printing Co Ltd), Jun. 27, 1995.

Patent Abstracts of Japan, vol. 096, No. 002, Feb. 29, 1996 & JP 07 258504 A (Sumitomo Bakelite Co Ltd), Oct. 9, 1995.

Patent Abstracts of Japan, vol. 108, No. 082, (C–1164), Feb. 10, 1994 & JP 05 287173 A (Japan Synthetic Rubber Co Ltd), Nov. 2, 1993.

*Primary Examiner*—Donald R. Wilson
*Attorney, Agent, or Firm*—Frommer Lawrence & Haug LLP; Jerome Rosenstock

[57] ABSTRACT

This invention discloses blends of cyclic olefin polymers and styrene-containing elastomers useful as molding compositions to mold articles therefrom. The articles so molded exhibit improved mechanical properties without any significant effect on optical properties, making them ideally suitable for applications such as optical discs, lenses and the like.

10 Claims, 3 Drawing Sheets

CYCLIC OLEFIN POLYMER BLENDS EXHIBITING IMPROVED IMPACT RESISTANCE AND GOOD TRANSPARENCY

FIELD OF THE INVENTION

This invention relates generally to polymer blends, and specifically to novel cyclic olefin polymer compositions which exhibit improved impact resistance as well as good transparency.

BACKGROUND OF THE INVENTION

Cyclic olefin polymers are well known in the art. See, for example, U.S. Pat. No. 5,087,677, and references cited therein, which describes a process for preparing cyclic olefin polymers using a catalyst system that comprises a metallocene compound and an aluminoxane. Some other patents of interest in this regard include, for example, U.S. Pat. Nos. 5,422,409; 5,324,801; 5,331,057; 4,943,611; 5,304,596 and EP 608903. Well studied cyclic olefin polymers are cyclic olefin copolymers which are copolymers of a cyclic olefin (such as, for example, norbornene) and an acyclic olefin (such as, for example, ethylene). While cyclic olefin copolymers are known to possess good mechanical and optical properties suitable to be used as engineering resins and thermoplastics, for certain applications such as, for example, optical discs, lenses and the like, improved impact resistance and elongation as well as good optical transparency would be highly desirable.

The transparency of a polymer determines its suitability for optical applications. The higher the transparency, the more suitable it is for certain applications such as, for example, lenses. The impact strength of polymers generally governs their resistance to breakage, usually when struck at high velocities, and is a measure of their toughness. Typically, the impact strength of a polymer is improved by forming suitable blends of the polymer with a suitable elastomer or elastomers to form shock-absorbing rubbery domains in the polymer. This approach is most successful when there is a strong interaction between the surface of the rubbery domains and the polymer. When one prepares blends of an optically useful polymer to improve its impact strength, one has to make sure that the transparency of the polymer is not sacrificed. It will be useful if the blends maintain or improve the transparency in addition to increased impact strength, i.e., if the blends are isorefractive to the polymer. It will also be highly desirable to preserve the processability of the polymer after blending.

Thus, it is an object of this invention to provide suitable blends of cyclic olefin polymers exhibiting improved impact resistance with a Notched Izod greater than 1 ft-lb/in.

It is an additional object of this invention to provide cyclic olefin polymers exhibiting good transparency, with an optical transmission greater than 85% and optical haze less than 10%.

It is a further object of this invention to provide cyclic olefin polymers exhibiting improved impact resistance and good transparency.

It is yet another object of this invention to provide processable cyclic olefin polymers exhibiting improved impact resistance and good transparency.

Other objects and advantages of the present invention shall become apparent from the accompanying summary, description and examples.

BRIEF SUMMARY OF THE DRAWINGS

The invention is described in detail below with reference to FIGS. 1–3.

SUMMARY OF THE INVENTION

Figure 1:
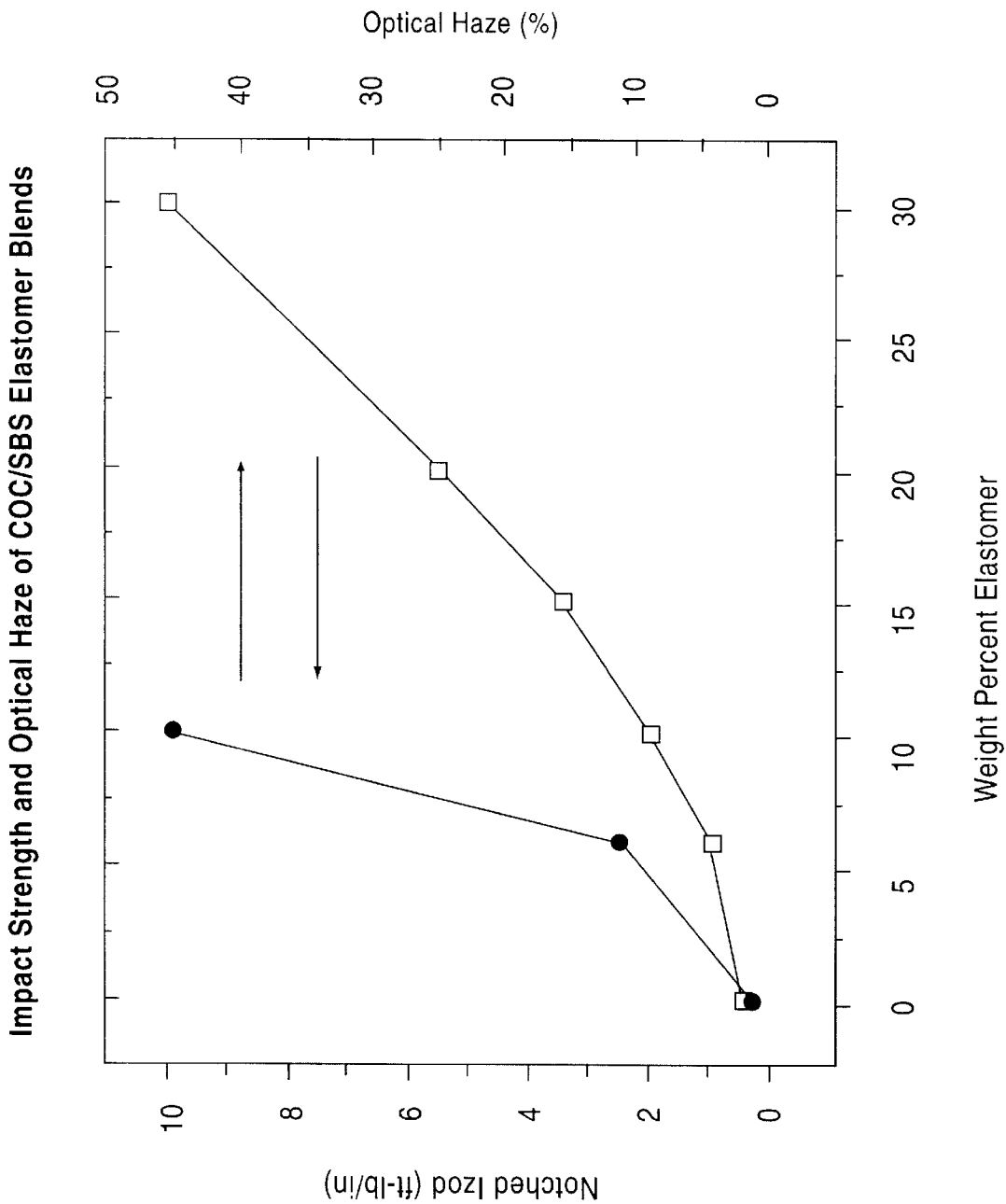
FIG. 1 is a plot of the impact strength of the inventive COC/elastomer blends (as notched izod) versus the weight percent of the elastomeric content, as well as a plot of the optical haze of the same blends versus the weight percent of the elastomer.

One or more of the foregoing objects are accomplished by the present invention which provides polymeric compositions comprising blends of cyclic olefin polymers with effective amounts of one or more suitable styrene-containing rubbers (elastomers). Such blends exhibit excellent adhesion of the rubber to the polymer matrix, as well as optimum particle size, thus improving toughness. Such blends also exhibit excellent matching of the refractive index of the rubber to that of the polymer matrix over a range of wavelengths, thus maintaining good transparency. The blends furthermore exhibit good processability to prepare films, for example, by standard processes such as, for example, molding, extrusion and the like.

The cyclic olefin polymers useful in preparing the inventive blends may be homopolymers or copolymers of cyclic olefins. Examples of suitable cyclic olefin monomers are norbornene, tetracyclododecene, bicyclo[2,2,1]hept-2-ene, 1-methylbicyclo[2,2,1]hept-2-ene, hexacyclo[6,6,1,1$^{3,6}$,1$^{10,13}$,0$^{2,7}$,0$^{9,14}$]-4-heptadecene, and the like, and combinations thereof. Many such monomers are well known and are described, for example, in U.S. Pat. No. 5,008,356. In the case of cyclic olefin copolymers ("COCs"), the comonomer or comonomers are chosen from a variety of suitable olefins, including, for example, acyclic olefins. Many such comonomers are also well known in the literature, including, for example, the above-noted U.S. Pat. No. 5,008,356. More specifically, the present invention discloses toughened, transparent COCs, wherein the cyclic olefin monomer comprises norbornene, and the comonomer comprises acyclic olefins such as, for example, ethylene, propylene and the like. Still more specifically, the invention discloses toughened, transparent copolymers of norbornene and ethylene. Suitable rubbers include, but are not limited to, styrene-butadiene-styrene ("SBS") elastomers, styrene-ethylene-butylene-styrene ("SEBS") elastomers, styrene-ethylene-propylene-styrene ("SEPS") elastomers, and combinations thereof. The average particle size of the rubber particles in the blend is in the range 0.2–2 $\mu$m. In the case of COC-SBS blends, the inventive blends comprise up to 40% weight percent of the SBS rubber in the compositions; and the SBS rubber comprises up to 50 weight percent styrene content. In the case of the COC-SEBS and COC-SEPS blends, the inventive blends comprise up to 40 weight percent of the styrene modifier rubber in the compositions; the SEBS rubber and the SEPS rubber comprise up to 66 weight percent styrene content. Such blends exhibit desired impact strength and transparency. Desired impact strength refers to notched values of equal to, or more than, 1 ft-lb/in. Desired transparency refers to at least 85% transmission of light and optical haze of less than 10% at a given frequency. The invention further discloses molded parts made from the disclosed molding compositions.

DETAILED DESCRIPTION OF THE INVENTION

In one embodiment, the present invention describes molding compositions exhibiting improved impact strength as well as good transmission. The compositions comprise blends of cyclic olefin polymer or copolymer and suitable rubbery materials. Preferred rubbery materials are styrene-containing elastomers. Preferred styrene-containing elastomers are styrene-butadiene-styrene ("SBS") elastomer, styrene-ethylene-butadiene-styrene ("SEBS") elastomer, styrene-ethylene-propylene-styrene ("SEPS") elastomer and combinations thereof. Many isuch elastomers are commercially available such as, for example, the KRATON® brand elastomers from Shell Chemical Company, Houston, Tex. and SEPTON brand elastomers from Kuraray Co., Tokyo, Japan. Variations are also available containing various amount of styrene in the elastomer. Elastomers containing different amounts of the monomers, e.g., styrene, may also be prepared by well known processes such as, for example, blending different elastomers in suitable proportions to arrive at a new elastomeric composition containing a monomer ratio different from the starting materials. Such variations offer unique advantages in the present invention, by improving the impact strength without significantly affecting the optical properties, making these blends uniquely suitable for applications where such properties are desired and needed. Such blends have refractive indices that are typically within 0.05 of the refractive index of COC and more often within 0.03 of the refractive index of COC over the visible wavelength range. Since COC polymers by themselves (without additives, see Example 1) do not possess high toughness, this invention uniquely offers blended COCs with highly improved toughness without significantly affecting optical properties. Combined with the high Tg characteristics typical of COC polymers, this invention thus offers polymeric blends with high mechanical and optical properties suitable to be processed by conventional processes into useful articles. The invention is illustrated below by means of blends containing a COC polymer which is a copolymer of norbornene and ethylene and suitable styrene-containing elastomers.

The inventive blends are prepared by combining the COC polymeric material with the elastomer or elastomers by standard procedures. The elastomer or elastomers should have the requisite refractive index characteristics to match the refractive index of the COC as closely as possible. This would maximize the optical characteristics of the resultant blend. In order to achieve this, the refractive indices of the COC and the elastomer are measured by standard procedures prior to blending. The blending is preferably performed in an extruder. This helps in converting the blended material into a shape suitable to be used in a suitable molding machine to make the desired parts. The molding conditions should be selected according to the nature of the materials chosen as is well known to those with ordinary skill in the art. For example, in one experiment, the KRATON D1184® brand SBS elastomer (available from Shell Chemical Company, Houston, Tex.) and a COC (a copolymer of norbornene and ethylene with norbornene content of 40% and Tg 135° C., available under the trade name TOPAS™ from Hoechst AG, Frankfurt, Germany) were tested for their refractive index match and found to closely match over a wide wavelength range. Such materials may be taken together in a suitable weight/weight ratio in a suitable extruder such as, for example, the Leistritz® brand extruder (Model Number MC 18GG/GL, available from American Leistritz Extruder Corp., Somerville, N.J.), and blended and extruded at suitable temperatures and rotating speeds into pellets. The pellets may then be taken in an apparatus to be molded into suitable parts. Such techniques as well as selection of molding conditions are well known to those skilled in the art. For example, the pellets may be loaded into an Arburg All Rounder Injection molding machine (Model 220M, available from Polymer Machinery, Berlin, Conn.), and molded into suitable parts such as, for example, flexure bars, of desired suitable thickness. The impact strength (as measured by Notched Izod) as well as the transmission of light at given wavelengths may be measured on the molded parts by suitable techniques well known to those skilled in the art.

The amount of the elastomer (and thereby the amount of styrene in the resultant blend) generally affects the properties of the pellets and the parts molded therefrom. By varying the nature of the elastomer or elastomers and/or varying the styrene content of the elastomer, one can change the properties of the molded parts significantly. By employing unique ratios of elastomers as well as unique mixture of styrenic elastomers, as described in the EXAMPLES section below, this invention offers highly improved COC blends suitable for unique applications related to, for example, the optical and mechanical fields. Furthermore, by properly choosing the rubber materials, the average particle size in the blends may be adjusted to be within the range of 0.2–2 μm. This property, along with the excellent adhesion of the rubber material to the COC polymer in the inventive blends contributes to the excellent optical characteristics of the parts molded from the blends.

Generally, in the case of COC-SBS blends, the invention prefers rubber modifiers containing up to about 40 weight % of the SBS in the blend. A similar ratio is preferred for the COC-SEBS and the COC-SEPS blends. For blends containing COC-SBS-SEBS and COC-SBS-SEPS, a total of 40 weight percent of the rubber in the blend is preferred. A styrene amount of about 60 weight % in the SEBS and SEPS was found to be beneficial in lowering the optical haze of the parts molded. For example, in one experiment, the KRATON D1184® brand SBS elastomer (available from Shell Chemical Company, Houston, Tex.), a SEPTON 2104 brand SEPS elastomer(66% styrene), a SEPTON 1050 brand SEPS elastomer (50% styrene, obtained from Kuraray Co., Tokyo, Japan) and a COC (a copolymer of norbornene and ethylene with norbornene content of 40% and Tg 135° C., available under the trade name TOPAS™ from Hoechst AG, Frankfurt, Germany) were tested for their refractive index match and found to closely match over a wide wavelength range. Such materials may be taken together in a suitable weight/weight ratio in a suitable extruder such as, for example, the Leistritz® brand extruder and blended and extruded at suitable temperatures and rotating speeds into pellets. The pellets may then be taken in an apparatus to be molded into suitable parts. Such techniques as well as selection of molding conditions are well known to those skilled in the art. For example, the pellets may be loaded into an Arburg All Rounder Injection molding machine and molded into suitable parts such as, for example, flexure bars, of suitable thickness. The impact strength as notched izod as well as transmission of light at given wavelengths may be measured on the molded parts by suitable techniques well known to those skilled in the art.

Another embodiment of the present invention relates to blends of COC polymers with suitable rubbery materials such as, for example, the elastomers noted above, further containing core shell modifiers. Core shell modifiers are polymeric materials well known in the art, and many are available commercially, for example, the methacrylate-butadiene-styrene type core shell modifier with the trade name KANAKE® (available from Kanake Texas Corporation, Houston, Tex.). Blends may be prepared where the core shell modifier content is more or less than the rubbery materials, thus varying the properties of the resultant blends and parts molded therefrom. The combination of the core shell modifiers together with the elastomers noted above blended in the COC polymers advantageously results in improved impact resistance, over that containing core shell elastomers alone in COC.

Another embodiment of the present invention relates to the blending of chemically modified elastomers into COC. Such elastomers have improved adhesion to COC which in turn improves the impact strength. For example, in one experiment, an SEBS elastomer FG1901X (obtained from Shell Chemical Company, Houston, Tex.) that had 2% succinic anhydride chemically bonded along the polymer backbone, was blended into COC using the above mentioned techniques. This resulted in improved impact resistance properties. A similar combination of FG1901X with other SBS, SEBS and core shell elastomers mentioned above blended in COC is very likely to result in improved impact resistance and good optical transparency.

Another embodiment of the present invention relates to halogenated SEBS and SEPS elastomers blended in COC. Halogenated SEBS and SEPS refers to SEBS and SEPS wherein one or more halogen atoms are covalently bonded on the styrene. Commonly known are the brominated SEBS and SEPS. Halogenated SEBS and SEPS with about 30% styrene content have a refractive index close to that of COC over a wide wavelength range. When such halogenated SEBS and SEPS elastomers are blended in COC and tensile bars molded from the pellets, toughness is greatly improved, without significantly affecting the optical properties.

Another embodiment of the present invention relates to the addition of various additives to blends of elastomers and COC. Such additives include, but are not limited to, antioxidants, UV stabilizers, and processing aids such as waxes and oils. Such additives improve the processing of the COC/elastomer blends and the molding of parts therefrom.

The teachings of the present invention are equally applicable to molding compositions comprising cyclic olefin moieties and effective amounts of suitable rubber modifiers covalently linked in the polymer chain instead of as blends.

The following EXAMPLES are provided in order to further illustrate the present invention but the invention is not to be considered limited thereby in any way.

EXAMPLES

In the following Examples, the term "COC polymer" refers to a copolymer of norbornene and ethylene with a respective molar ratio of about 1:1. The COC polymer was prepared as described in U.S. Pat. No. 5,087,677, was in the form of pellets and had a $T_g$ of about 135° C.

Example 1
Properties of COC without modifiers:
The above-noted COC polymer with a glass transition temperature of 135° C. was molded into tensile bars and flex bars using an Arburg 220M injection molding machine. The temperature of the barrel was 240° C., the injection pressure was 15,000 psi, the screw rotation speed was 30 rpm and the cycle time was 20 seconds. The impact strength (Notched Izod) of the flexure bars was measured according to ASTM D256 (published by the American Society of Testing Materials, Philadelphia, Pa., 1994, Vol. 8.01), and the optical haze of the blends was measured on a disk with a Macbeth Color Eye 7000 (Macbeth Co., Newburgh, N.Y.)) according to ASTM D1003 (published by the American Society of Testing Materials, Philadelphia, Pa., 1994, Vol. 8.01). The Notched Izod was 0.4 ft–lb/in, the elongation was 2%, the tensile modulus was 0.45 Mpsi, the optical transmission was 91% and the optical haze was 1%.

Figure 2:
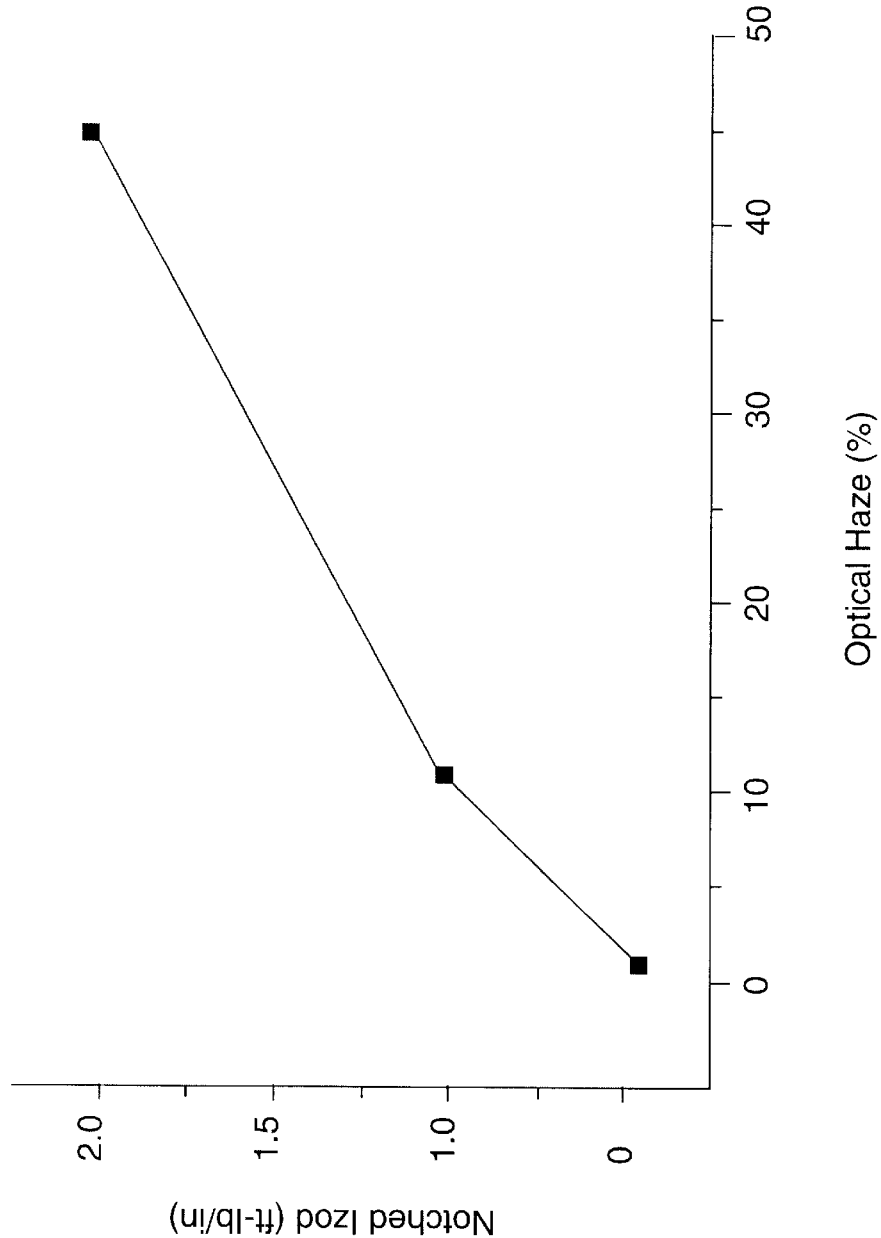
FIG. 2 is a plot of the impact strength of the COC/elastomer blends versus the optical haze of the same blends.

Example 2
Preparation of a blend of COC polymer with SBS elastomer:
The refractive indices of the COC polymer and commercially available SBS elastomers were measured with a Metricon 2010® thin film apparatus (Metricon Corp., Pennington, N.J.) as a function of wavelength. The KRATON D1184® brand SBS elastomer (available from Shell Chemical Company, Houston, Tex.) containing 30% of styrene was selected based on its substantial closeness in refractive index values (ranging between 1.525 and 1.57) to the COC polymer over the wavelength range 0.4–0.8 μm. The process of blending involved mixing the COC polymer with the SBS elastomer in a Leistritz® brand extruder (Model MC 18GG/GL, Leistritz AG). The design of the twin screws consisted of conveying elements, 3 kneading blocks and then additional conveying elements. The ratio of the length L to diameter D was 30. The screws were corotating at 450 rpm and the temperature of mixing was about 230° C. Several blends were prepared by using the SBS elastomer containing differing amounts of the elastomer. The compounded pellets were then molded in an Arburg® brand All Rounder injection molding machine (Model 220M) where the barrel temperature was about 240° C. and the temperature of the mold was about 90° C. to yield flexure bars and disks(⅛ inch thick). The impact strength (Notched Izod) of the flexure bars was measured according to ASTM D256 (published by the American Society of Testing Materials, Philadelphia, Pa., 1994, Vol. 8.01), and the optical haze of the blends was measured on a flexure bar with a Macbeth Color Eye 7000 (Macbeth Company, Newburgh, N.Y.) according to ASTM D1003 (published by the American Society of Testing Materials, Philadelphia, Pa., 1994, Vol. 8.01). The results are shown in FIGS. 1 and 2. FIG. 1 is a plot of the impact strength and haze of the COC polymer/D1184 blends as a function of the concentration of the SBS elastomer in the blend. FIG. 2 is a plot of the impact strength versus the optical haze of the blends. The results in FIGS. 1 and 2 demonstrate that the D1184 brand elastomer is effective in toughening the COC polymer, e.g., by achieving notched izod values of 10 ft-lb/in with 30 weight % elastomer. With 10 weight % elastomer, notched izod values of 2 ft-lb/in and optical haze of 44% were achieved. The elongation at break was 16%. The average particle size was 0.7 μm.

Example 3
Preparation of a blend of COC polymer with SBS and SEBS elastomers:
For this blending, an SEBS elastomer containing a styrene content of 58% was used as a compatibilizer to improve impact and optical properties. It was prepared by compounding suitable quantities of KRATON G1650® (30% styrene; from Shell Chemical Company), SEPTON 1050® (50% styrene; from Kuraray Co., Tokyo, Japan) and SEPTON 2104® (66% styrene; from Kuraray Co., Tokyo, Japan) in a Leistritz extruder similar to the blending procedure in Example 2 but at a rotating speed of 100 rpm. The ratio of the SEBS elastomers was chosen such that the average styrene content was 58% in the blended SEBS elastomer, and its refractive index was closely matched to COC over the visible wavelength range.

Figure 3:
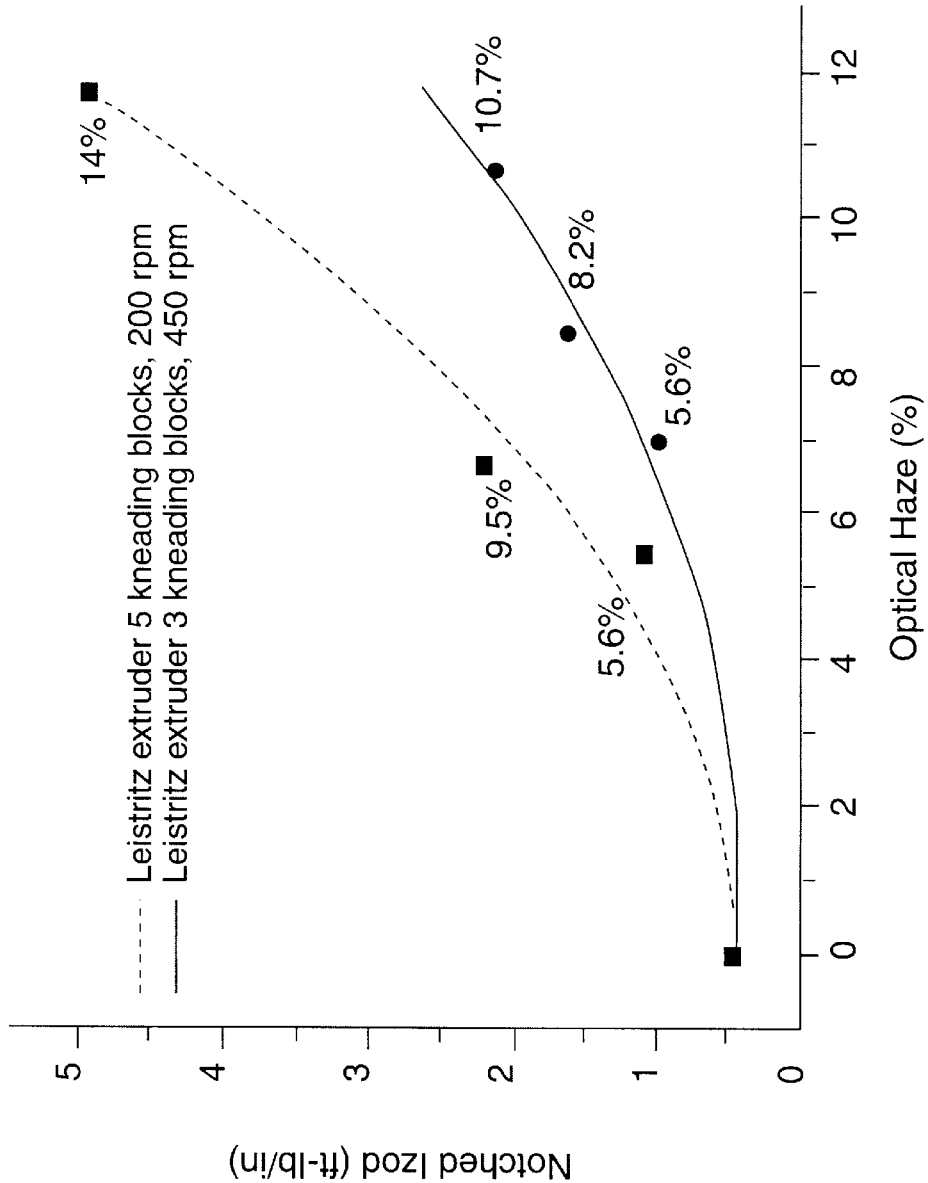
FIG. 3 is a plot of the impact strength versus optical haze of the blends as influenced by the processing conditions and the addition of compatibilizer.

A blend containing SEBS (58% styrene) prepared as described above, SBS (KRATON D1184) and COC polymer was prepared using the blending conditions of Example 2. The ratio of SBS to SEBS was 2:1. The total elastomer content was varied between 0 and 15% w/w. When 3 kneading blocks were used on the compounding screw of the Leistritz extruder with a rotation speed of 450 rpm and then molded to flexure bars (see Example 2), a substantial improvement in optical haze was noticed, as compared to the COC/SBS blends of Example 2, thus showing that the SEBS elastomer was functioning as a compatibilizer for the COC/SBS blends of Example 2. The results are shown in FIG. 3. When 5 kneading blocks were used instead of 3 kneading blocks (more intense mixing with a rotation speed of 200 rpm), even more improvements were achieved. FIG. 3 also shows the results of improved impact strength versus optical haze as a result of more intense mixing. Thus, for example, with 3 kneading blocks, a 10.7% elastomer in COC yielded a haze of 10.5% with notched izod of 2 ft-lb/in, whereas with 5 kneading blocks a 9.5% elastomer in COC yielded a haze of 7% with notched izod of 2 ft-lb/in. The elongation at break was between 6 and 20% when the elastomer content was between 5 and 15% by weight in COC. The average particle size of the elastomer particles in COC ranged 0.3–1 μm.

Example 4

Preparation of a blend of COC polymer with SEBS elastomer alone:

A blend containing COC polymer and 30 weight % SEBS was prepared as in Example 2. The SEBS had a styrene content of 58%. This was obtained by compounding suitable quantities of KRATON G1650® (30% styrene; from Shell Chemical Company), SEPTON 1050® (50% styrene; from Kuraray, Japan) and SEPTON 2104® (66% styrene; from Kuraray Co., Tokyo, Japan) in a Leistritz extruder similar to the blending procedure in Example 2 but at a rotating speed of 100 rpm. The ratio of the SEBS elastomers was chosen such that the average styrene content was 58% in the blended SEBS elastomer, so that its refractive index was closely matched to COC over the visible wavelength range. The optical haze was 10%, while the notched izod was 0.8 ft-lb/in. The average particle size in this Example was 0.25 pm. Even though the impact strength was improved over COC, it was not as effective as the combination of both SBS and SEBS elastomer described in Example 3.

Example 5

Preparation of a blend of COC polymer with the SBS and SEBS elastomers and core shell modifier:

The core shell modifier used was of the methacrylate-butadiene-styrene type sold commercially under the trade name KANAKE B582® by Kanake Texas Corp., Houston, Tex. A blend containing 3.7 weight % SBS (KRATON D1184), 1.85 weight % KANAKE B 582®, and 1.85 weight % SEBS (58% styrene content) was prepared as in Examples 2 and 3. The impact strength of the resultant bars was 0.7 ft-lb/in and optical haze 14.9%. When the blend contained 4.6 weight % SBS, 1.8 weight % KANAKE B582 and 1.8 weight % SEBS, the impact strength improved to 1.37 ft-lb/in but the haze also increased, to 24%. When the mixture contained 15 weight % KANAKE B582®, 5 weight % SEBS and blended at 100 rpm, the impact strength was 1.3 ft-lb/in, while the haze improved to 15%. For comparison, a COC blended with 20 weight % KANAKE B582® (without the SBS and SEBS) had an impact strength of Notched Izod of 1 ft-lb/in and haze of 22%.

Example 6

Preparation of a blend of COC polymer with a brominated SEBS elastomer:

A brominated SEBS elastomer containing 30% brominated styrene was blended into COC polymer as in Example 2. The refractive index of this brominated styrene elastomer (1.5205 at 633 μm) was close to that of COC (1.53 at 633 μm). 10% by weight of brominated SEBS in COC gave an impact strength of 1.7 ft-lb/in and was substantially transparent.

Example 7

Preparation of a blend of COC polymer with an SEBS elastomer containing 2% succinic anhydride.

A chemically modified SEBS elastomer FG 1901X (from Shell Chemical Company) was blended in COC. 20% by weight of elastomer was blended in COC using the steps in Example 2 and the resultant Notched Izod impact strength was 0.6 ft-lb/in.

What is claimed is:

1. A composition blend suitable for molding objects therefrom, which consists essentially of (i) a copolymer of norbornene and an acyclic olefin in a respective molar ratio of 1:1 and (ii) effective amounts of a styrene-butadiene-styrene copolymer modifier having up to 50 weight percent styrene content present in an amount of about 1% by weight up to about 40% by weight of the-composition to impart to said composition Notched Izod impact strength according to ASTM D256 equal to or greater than 1 ft.-lb/in.

2. The composition of claim 1, wherein said acyclic olefin is selected from the group consisting of ethylene, propylene, 1-butene, and combinations thereof.

3. The composition of claim 1, wherein said modifier is present in amounts of 1–20 weight percent in the blend.

4. The composition of claim 1, wherein said modifier is present in amounts of 2–10 weight percent in the blend.

5. The composition of claim 1, wherein said modifier has a refractive index within 0.05 of the refractive index of said polymer over the visible wavelength range.

6. The composition of claim 1, wherein said modifier has a refractive index within 0.03 of the refractive index of said polymer over the visible wavelength range.

7. The composition of claim 1, wherein said modifier has a refractive index within 0.01 of the refractive index of said polymer over the visible wavelength range.

8. A molding composition to mold articles therefrom, which composition consists essentially of a copolymer of norbornene with ethylene in a respective molar ratio of 1.1, and effective amounts of a styrene-butadiene-styrene copolymer modifier having up to 50 weight percent styrene content present in an amount of about 1 to about 40% by weight of the composition to impart to said composition Notched Izod impact strength according to ASTM D256 equal to or greater than 1 ft-lb/in.

9. A molded article prepared from the composition of claim 1.

10. The composition of claim 1 wherein said copolymer is a copolymer of norbornene and ethylene.

* * * * *